(12) United States Patent
Soliman et al.

(10) Patent No.: US 8,043,194 B2
(45) Date of Patent: Oct. 25, 2011

(54) VEHICLE CREEP CONTROL IN A HYBRID ELECTRIC VEHICLE

(75) Inventors: Ihab S. Soliman, Warren, MI (US); Andrew J. Silveri, Royal Oak, MI (US); Deepak Aswani, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1054 days.

(21) Appl. No.: 11/867,752

(22) Filed: Oct. 5, 2007

(65) Prior Publication Data

US 2009/0093336 A1 Apr. 9, 2009

(51) Int. Cl.
*B60W 10/02* (2006.01)
*B60W 10/08* (2006.01)

(52) U.S. Cl. .......................................... 477/5; 477/174

(58) Field of Classification Search .................. 477/3–6, 477/70, 83–84, 93, 107, 114, 174–175
See application file for complete search history.

(56) References Cited

U.S. PATENT DOCUMENTS

| | | | |
|---|---|---|---|
| 6,258,006 B1 * | 7/2001 | Hanyu et al. ...................... | 477/5 |
| 6,656,090 B2 * | 12/2003 | Matsumura et al. ........... | 477/171 |
| 6,808,470 B2 * | 10/2004 | Boll ................... | 477/6 |
| 7,686,112 B2 * | 3/2010 | Shiiba ..................... | 180/65.275 |
| 7,708,095 B2 * | 5/2010 | Hirata ....................... | 180/65.275 |
| 2002/0023789 A1 | 2/2002 | Morisawa et al. | |
| 2003/0171186 A1 | 9/2003 | Okada et al. | |
| 2006/0137921 A1 * | 6/2006 | Colvin et al. ................. | 180/65.2 |
| 2008/0228369 A1 | 9/2008 | Stroh et al. | |
| 2009/0143950 A1 * | 6/2009 | Hasegawa et al. .............. | 701/68 |

FOREIGN PATENT DOCUMENTS

WO   WO2004028848 A1   8/2004

\* cited by examiner

*Primary Examiner* — Justin Holmes
*Assistant Examiner* — Huan Le
(74) *Attorney, Agent, or Firm* — David B. Kelley; MacMillan, Sobanski & Todd, LLC (57) ABSTRACT

In a powertrain that includes wheels for driving a vehicle, an engine including a crankshaft, a machine driveably connected to the crankshaft and able to operate alternately as an electric motor and electric generator, a transmission including an input clutch driveably connected to the crankshaft and an output driveably connected to at least two of the wheels, and an electric storage battery having a variable state of charge and electrically connected to the machine, a method for controlling vehicle creep including adjusting a torque capacity of the input clutch to a desired magnitude of input clutch torque transmitted to the wheels, determining a desired change in torque produced by the machine such that a speed of the crankshaft is controlled to a desired idle speed, using the magnitude of input clutch torque capacity and the desired change in torque produced by the machine to determine a desired magnitude machine torque, and using the machine to produce said desired magnitude of machine torque.

25 Claims, 5 Drawing Sheets

VEHICLE CREEP CONTROL IN A HYBRID ELECTRIC VEHICLE

BACKGROUND OF THE INVENTION

1. Field of the Invention

This invention relates generally to an apparatus and method for controlling vehicle creep in a hybrid electric vehicle (HEV).

2. Description of the Prior Art

A powershift transmission is a geared mechanism that includes no torque converter, but instead employs two input clutches driveably connected to an engine crankshaft. The transmission produces multiple gear ratios in forward and reverse drive and transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

In a vehicle powertrain that provides a continuous drive connection between a power source and the vehicle wheels, creep is the tendency for a vehicle, when at a stand-still or relatively low speed, to move slowly in either a forward or reverse direction, depending on the position of the gear selector, when neither the accelerator pedal nor brake pedal is depressed. Generally, a vehicle operator expects the vehicle to creep (1) from a standstill as the driver releases the brake pedal with no accelerator pedal input, and (2) from a coast down condition as the vehicle decelerates to a lower speed with little or no wheel brake or accelerator pedal input.

The vehicle will creep to a unique terminal speed, i.e., a relatively low speed, for a given road load and vehicle load. The creep speed declines with increasing road grade until it reaches zero and vehicle roll-back becomes imminent. The engine should never stall during a vehicle creep condition. The vehicle creep speed is a defined and specified vehicle requirement.

For a vehicle with a conventional automatic transmission, vehicle creep is automatically provided as a result of the torque transfer provided through the torque converter's fluid coupling. In a vehicle having a powershift transmission, the vehicle creep torque is provided by controlling the clutch torque capacity while slipping the clutch in order to prevent engine stall.

During a vehicle creep condition, the transmission clutch torque capacity is further increased as the driver releases the brake pedal. The increase in clutch torque capacity disturbs the control of the engine idle speed because the increase in clutch torque capacity loads the engine. Therefore, engine idle speed control must be coordinated with any increase in the clutch torque capacity in order to avoid poor engine idle speed control due to delayed engine torque response due to manifold filling as clutch torque capacity is increased, and potential engine stall if too much clutch torque capacity is provided while the engine torque has not increased accordingly.

Unlike a conventional vehicle powertrain having a powershift transmission, a hybrid electric vehicle with a powershift transmission includes multiple propulsion paths and "active" torque actuators, i.e., an engine and electric machines, which can be used during a vehicle creep condition. Therefore, a more sophisticated vehicle creep control system is needed to deal with the complexities and added powertrain operating modes of a HEV.

SUMMARY OF THE INVENTION

In a powertrain that includes wheels for driving a vehicle, an engine including a crankshaft, a first electric machine driveably connected to the crankshaft and able to operate alternately as an electric motor and electric generator, a second electric machine driveably connected to at least two of the wheels, a transmission including an input clutch driveably connected to the crankshaft and an output driveably connected to at least two of the wheels, and an electric storage battery having a variable state of charge and electrically connected to both electric machines, a method for controlling vehicle creep including adjusting the torque produced the second electric machine to provide vehicle creep torque to the wheels, adjusting a torque capacity of the input clutch to a desired magnitude of input clutch torque transmitted to the wheels, determining a desired change in torque produced by the first machine such that a speed of the crankshaft is controlled to a desired idle speed, using the magnitude of input clutch torque capacity and the desired change in torque produced by the first machine to determine a desired magnitude machine torque, and using the first machine to produce said desired magnitude of machine torque.

An advantage of the vehicle creep control system is its use of the additional propulsion paths and power sources to improve vehicle creep performance and account for the problems and deficiencies found in a conventional vehicle with a powershift transmission. The control strategy supports multiple HEV powertrain operating modes during vehicle creep conditions by blending torque produced by multiple power sources which are transmitted through multiple propulsion paths during vehicle creep conditions.

The vehicle creep control enhances powershift transmission control by providing coordinated clutch torque capacity control when vehicle creep is provided or assisted by the additional electric machines. The control is robust and provides responsive engine idle speed control due to electric machine responsiveness when controlling clutch torque capacity during vehicle creep. It automatically operates similar to a conventional vehicle with a powershift transmission when the electric power sources are not used. It is applicable to any HEV powertrain that includes either a powershift transmission having wet or dry input clutches, or an automatic transmission having no torque converter.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
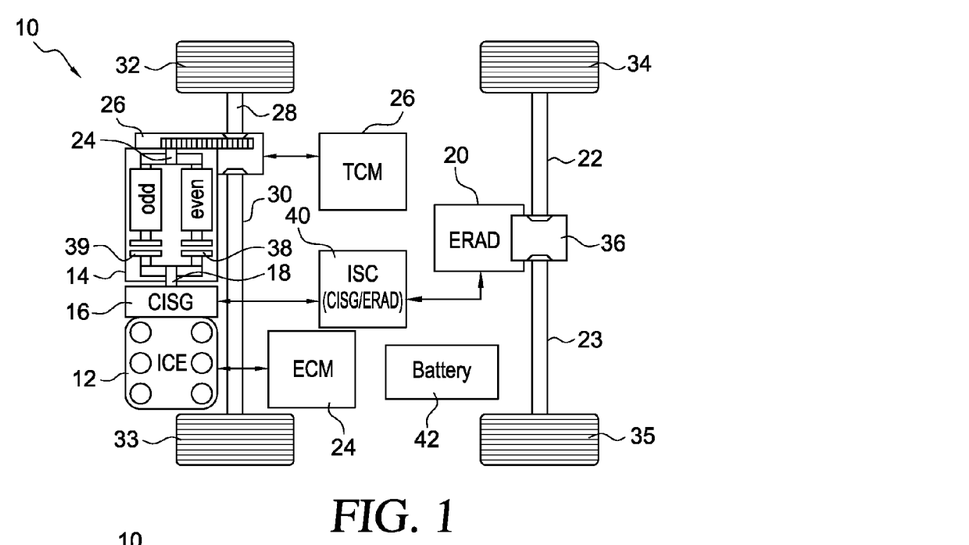
FIG. 1 is a schematic diagram showing an automotive vehicle powertrain of a hybrid electric vehicle that includes a powershift transmission.
Figure 2:
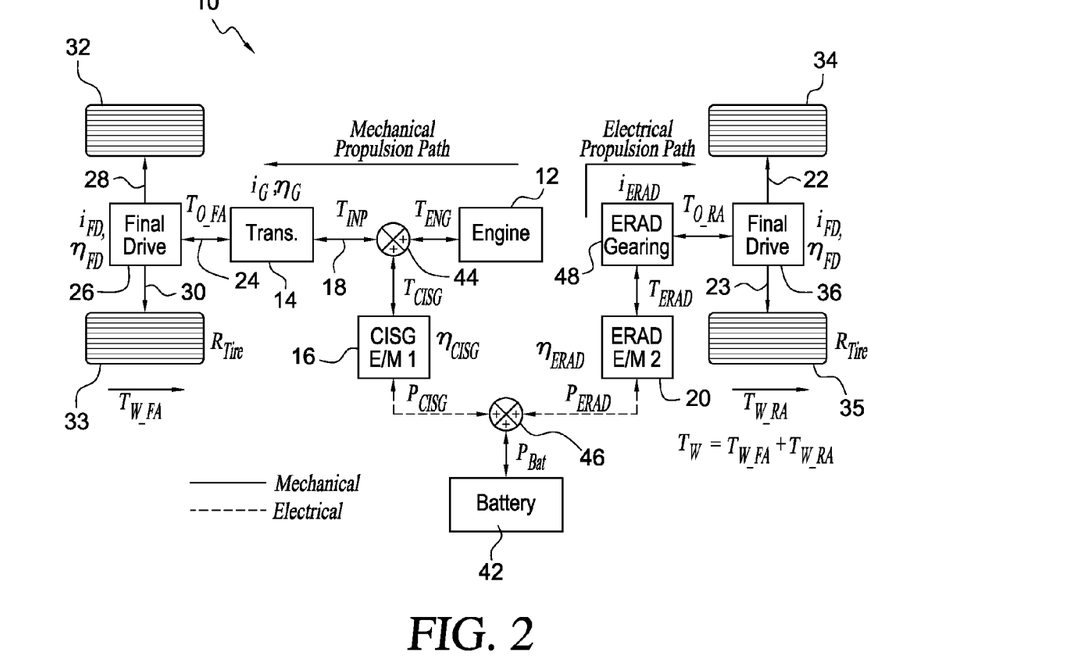
FIG. 2 is a schematic diagram showing propulsion and power flow of the vehicle powertrain of FIG. 1.

Referring first to FIGS. 1 and 2, the powertrain 10 configuration includes a first power source such as an internal combustion engine 12, a diesel engine or a gasoline engine; a power transmission 14 driveably for producing multiple forward and reverse gear ratios, such as a wet-clutch powershift transmission; an electric machine 16 driveably connected to the engine crankshaft and transmission input 18, such as a crankshaft integrated starter/generator (CISG) for providing starter/generator capability; and an additional electric machine 20 driveably connected to the rear axles 22,23, such as a electric rear axle drive (ERAD), for providing additional propulsion capability in either an electric drive or hybrid drive mode. The transmission output 24 is connected through a final drive unit and differential mechanism 26 to the front axles 28, 30, which drive the front wheels 32, 33, respectively. ERAD 20 drives the rear wheels 34, 35 through ERAD gearing 48, a differential mechanism 36, rear axles 22, 23 and wheels 34, 35.

An electronic engine control module (ECM) 24 controls operation of engine 12. An electronic transmission control module (TCM) 26 controls operation of transmission 14 and the input clutches 38, 39. An integrated starter controller (ISC) 40 controls operation of CISG 16, ERAD 20 and the system for charging an electric storage battery 42, which is electrically coupled to the electric machines 16, 20.

FIG. 2 shows the power and energy flow paths from the power sources 12, 16, 20 to the load at the vehicle wheels 32-35. Power produced by engine 12 and power produced by CISG 16 is combined at 44 and is transmitted to the transmission input 18. Electric power produced by both electric machines 16, 20 is combinable at 46 for charging the battery 42, or is transmitted from the battery to the electric machines. Mechanical power produced by ERAD 20 is transmitted through ERAD gearing 48 to the load at the rear wheels 34, 35 through the rear final drive 36.

In the HEV powertrain 10, power can be transmitted to the wheels 32-35 during a vehicle creep condition solely in an electric drive mode by the electric machine 20, independently of the engine 12 and transmission 14, or in a parallel drive mode by a combination of engine 12, transmission 14 and the electric machines 20, 16. Two propulsion paths, mechanical and electrical, can be used to meet a given propulsion demand request. The engine 12 and CISG 16 can provide power to the wheels by transmitting torque through the transmission 14 in the mechanical propulsion path to the front axles 28, 30, and the ERAD motor 20 can provide power directly in the electrical propulsion path to the rear axles 22, 23.

Figure 3:
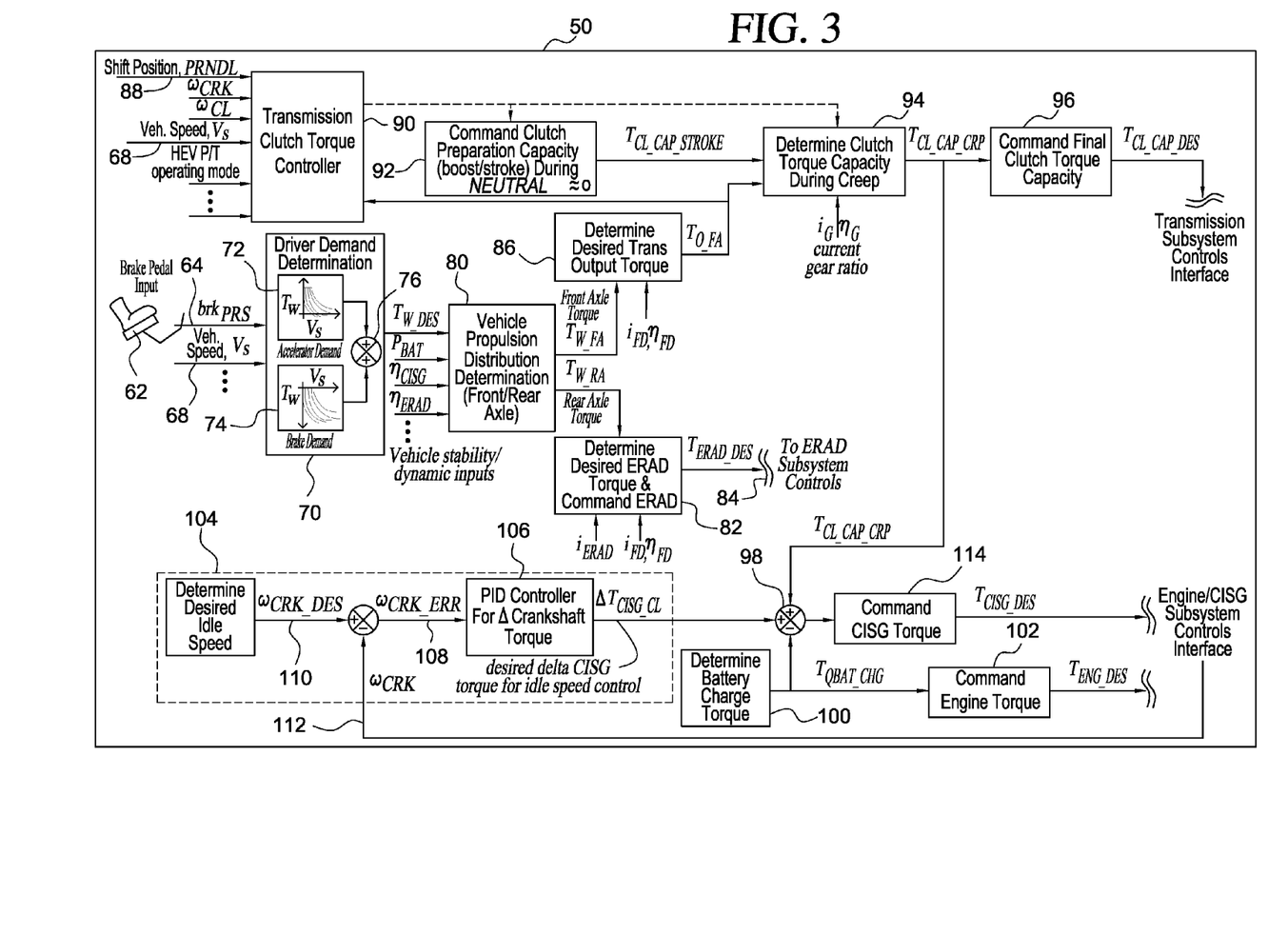
FIG. 3 is a schematic diagram of a vehicle creep controller.

Referring now to FIG. 3, a HEV creep control system includes a controller 50, which includes an electronic microprocessor, accessible to electronic memory containing stored functions, variables, and control algorithms and electronic signals produced by various sensors representing operating parameters and variables of the vehicle, engine 12, CISG 16, ERAD 20, transmission 14, input clutches 38, 39, ERAD gearing 48 and final drive 26, front and rear differentials 26, 36, such as CISG and ERAD speed and temperature sensors, a vehicle speed sensor, brake pressure sensor. The microprocessor executes the algorithms and produces control commands to which the engine 12, CISG 16 and ERAD 20 respond by producing torque, and the transmission 14 responds by engage and disengaging input clutches 38, 39 and alternately engaging a forward gear and reverse gear.

The vehicle operator's demand for wheel torque is represented by the degree to which the brake pedal 62 is depressed. An electronic signal representing the brake pedal position 62 produced by a sensor, an electronic signal representing the brake pressure 64 produced by a sensor in response to depressing the brake pedal 62, and an electronic signal 68 representing the current vehicle speed produced by a shaft speed sensor are received as input by a driver demanded wheel torque function 70. The accelerator pedal is not depressed when vehicle creep is being controlled. Function 70 accesses in electronic memory a first function 72, which produces a desired wheel torque when indexed by vehicle speed 68 and accelerator pedal position, and a second function 74, which produces a desired wheel torque indexed by vehicle speed and brake pedal displacement or brake pressure 64. At 76, the magnitude of the desired wheel torque $T_{W\_DES}$ required to meet the driver's propulsion request while vehicle creep control is operative is produced from the output produced by functions 72 and 74.

At 80, the wheel torque to be produced at the front wheels $T_{W\_FA}$ 32, 33 and rear wheels $T_{W\_RA}$ 34, 35 is determined such that the sum of the distributed propulsion torques equals the desired wheel torque determined from function 70. The strategy for propulsion distribution accounts for vehicle stability and dynamics constraints, energy management and efficiency criteria, the torque capabilities of the engine 12, CISG 40, ERAD 20, and transmission 14 and the state of charge (SOC) of battery 42.

At 82, the desired ERAD torque $T_{ERAD\_DES}$ is determined based on the rear axle wheel torque $T_{W\_RA}$ to be produced at the rear wheels 34, 35 and the gear ratios produced by the final drive 36 and ERAD gearing 48. At 84, controller 50 issues a command for ERAD 20 to produced the desired ERAD torque.

At 86, the desired transmission output torque $T_{O\_FA}$ is determined based on the front axle torque $T_{W\_FA}$ to be produced at the front wheels 32, 33 and the gear ratios produced by the final drive 26 and transmission 14.

If the magnitude of desired transmission output torque $T_{O\_FA}$ is greater than a reference torque magnitude, the gear selector 88 is in the Drive position, and the vehicle speed 68 is less than a reference vehicle speed, indicating that the transmission propulsion path will be used for vehicle creep, a vehicle creep control algorithm is entered and executed at 90. If these conditions are absent, control passes to 92 where the transmission 14 is maintained in neutral, with no torque at the transmission output 24. The input clutches 38, 39 are stroked, i.e., clearance spaces between components within the clutches are closed such that the clutches have no current torque transmitting capacity but have imminent torque capacity potential.

If these conditions are present, at 94, the desired transmission output torque $T_{O\_FA}$ and the current transmission gear are used to determine the clutch torque capacity $T_{CL\_CAP\_}$ $_{CRP}$ of the input clutch 38, 39 that is associated with the current gear during vehicle creep. At 96, a desired clutch torque capacity $T_{CL\_CAP\_DES}$ of the subject input clutch is commanded by controller 50 according to the creep clutch torque capacity $T_{CL\_CAP\_CRP}$ produced at 94. The torque capacity of the subject clutch is produced in response to the desired clutch torque command $T_{CL\_CAP\_DES}$, and a signal representing the clutch torque capacity $T_{CL\_CAP\_CRP}$ during vehicle creep is transmitted to a summing junction 98. The subject clutch is always slipping when vehicle creep is being controlled by controller 50.

If the SOC of battery 42 is less than a reference SOC, at 100, controller 50 determines the battery charge torque $T_{QBAT\_CHG}$ and at 102 issues an engine torque command $T_{ENG\_DES}$, the increase being substantially equal to the engine torque required to charge the battery. If the actual SOC of battery 42 is greater than the reference SOC, engine torque is controlled at 102 to zero brake torque since CISG 16 will control idle speed. A signal representing the battery charge torque $T_{QBAT\_CHG}$ is also transmitted to summing junction 98.

A crankshaft idle speed closed-loop control algorithm 104 is used to determine a desired change in CISG torque $\Delta T_{CISG\_CL}$ based on a crankshaft speed feedback error 108 between the desired idle speed 110 and actual crankshaft speed 112 using a PID closed-loop controller 106 or a comparable controller. The desired change in CISG torque $\Delta T_{CISG\_CL}$ produced by closed-loop controller 104 is also transmitted to summing junction 98.

At summing junction 98, the desired change in torque produced by CISG 16 $\Delta T_{CISG\_CL}$ and the creep clutch torque capacity $T_{CL\_CAP\_CRP}$ and the battery charge torque $T_{QBAT\_CHG}$ are added. The desired change in torque $\Delta T_{CISG\_CL}$ represents a closed-loop CISG torque required to maintain idle speed control, and the sum of battery charge torque $T_{QBAT\_CHG}$ and creep clutch torque capacity $T_{CL\_CAP\_CRP}$ represent an open-loop feed-forward CISG torque with which to maintain idle speed control. The battery charge torque $T_{QBAT\_CHG}$ is a negative value and reduces the feed-forward CISG torque since an increase in battery charge torque would cause an increase in idle speed. The creep clutch torque capacity $T_{CL\_CAP\_CRP}$ is a positive feed-forward CISG torque since an increase in clutch torque would cause a decrease in idle speed. At 114, controller 50 issues a command to produce the overall desired CISG torque $T_{CISG\_DES}$ according to the output of summing junction 98 which includes both the closed-loop and feed-forward CISG torque commands.

Controller 50 determines if the creep mode control algorithm 90 should be exited based on the current operating conditions. If the vehicle operator tips into the accelerator pedal and a sufficient increase in the desired transmission output torque occurs, and vehicle speed is above a reference speed, or if the gear selector 88 is moved to the Neutral/Park position, then the vehicle creep mode control is exited.

If these conditions are absent, control returns to 86. Clutch torque capacity is controlled according to either a vehicle launch condition upon the occurrence of a heavy accelerator pedal tip-in, or a transmission disengagement condition.

Figure 4A:
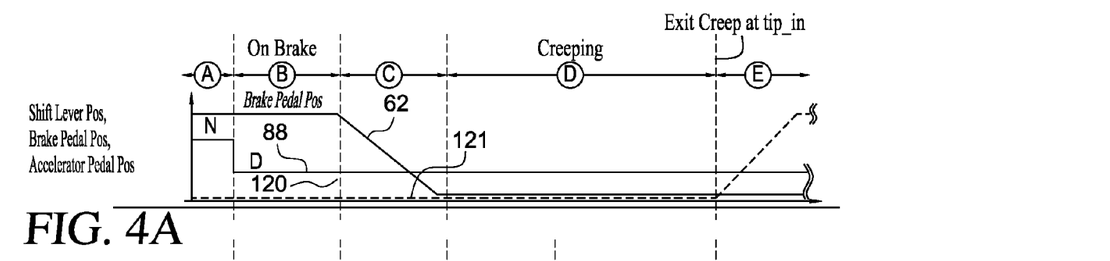
FIGS. 4A-4G are graphs of various powertrain and vehicle parameters before, during and following a vehicle creep condition in which torque blending is not used.

FIGS. 4A-4G are graphs of various powertrain and vehicle parameters before, during and following a vehicle creep condition in which torque blending is not used. FIG. 4A shows that the gear selector 88, i.e. shift lever position, may be in the N or neutral position during period A, thereafter it is moved to the D or drive position at the beginning of period B before vehicle creep control begins. The brake pedal 62 is depressed during periods A and B, and is released at the beginning of period C, where vehicle creep control begins at 120, and continues to be released until the beginning of period D. The accelerator pedal displacement 121 is zero throughout periods A-D and is depressed gradually during period E, which terminates the vehicle creep control.

Figure 4B:
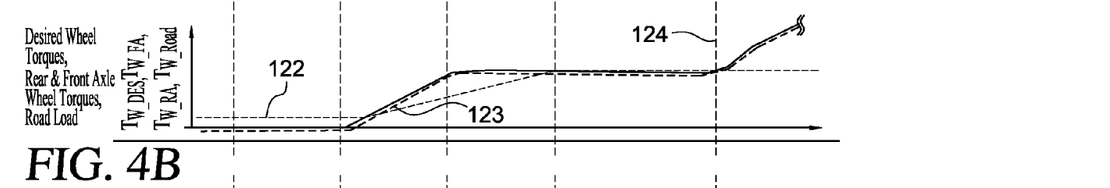

In FIG. 4B, the overall desired wheel torque $T_{W\_DES}$ 123 and desired front axle wheel torque $T_{W\_FA}$ increase at the beginning of creep control at 120 as the brake pedal 62 is released during period C and remain constant during period D until creep control terminates at 124. The desired front axle wheel torque $T_{W\_FA}$ is equal to the overall desired wheel torque $T_{W\_DES}$ since no rear axle wheel torque $T_{W\_RA}$ is provided by the ERAD 20. At a point during period D, the vehicle reaches a steady-state creep speed once the wheel torque is equal to the road load 122.

Figure 4C:
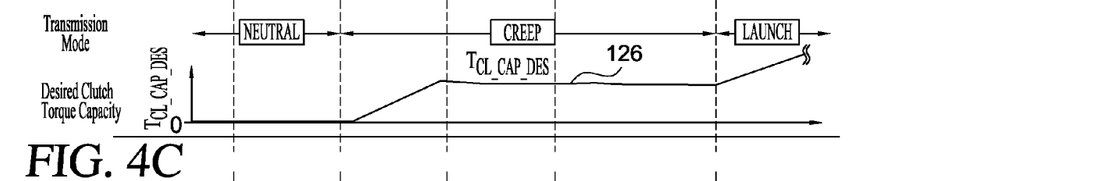

In FIG. 4C, the input clutch torque capacity is zero until it begins to ramp-up at the beginning of creep control 120 to the desired clutch torque capacity 126 since there is an increase in the desired front axle wheel torque $T_{W\_FA}$ During period D, the desired clutch torque capacity 126 remains constant since the desired front axle wheel torque $T_{W\_FA}$ is also constant until creep control terminates at 124.

Figure 4D:
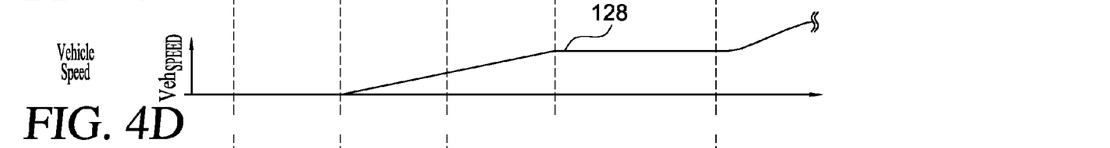

In FIG. 4D, vehicle speed is zero until it ramps-up at the beginning of creep control 120 as input clutch torque transmits the current crankshaft (engine and/or CISG) torque to the wheels. Vehicle speed reaches a controlled steady vehicle creep speed 128 once the wheel torque equals the road load 122, which remains constant until creep control terminates at 124.

Figure 4E:
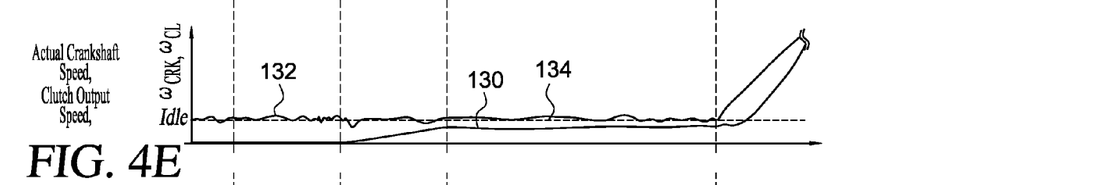

In FIG. 4E, the speed 130 at gear box side (i.e. clutch output) of the input clutch 38, 39 is zero until it ramps-up at the beginning of creep control 120 as the input clutch gains torque capacity. Clutch speed 130 is smaller than the crankshaft idle speed and remains constant until creep control terminates at 124. The speed 132 of crankshaft 18 is controlled to a constant desired crankshaft idle speed 134 until creep control terminates at 124.

Figure 4F:
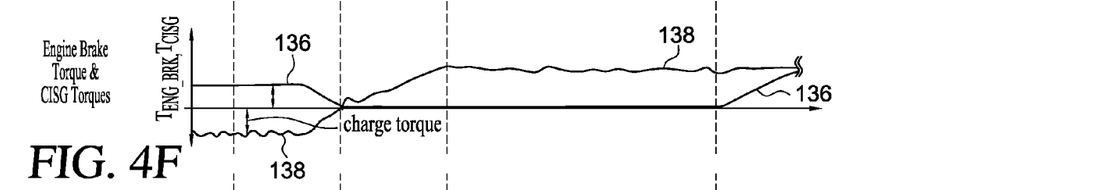

In FIG. 4F, engine brake torque 136 is positive and constant while battery 42 is being charged to the reference SOC required to supply electric energy to the CISG 16. Engine brake torque 136 decreases following the battery charge and remains constant until creep control terminates at 124 unless the battery SOC falls below the reference SOC. CISG torque 138 is negative during the battery charging period A & B, and ramps-up to a positive torque when vehicle creep control begins at 120 due to the increase in clutch torque capacity. During period D, CISG torque 138 remains constant and positive until creep control terminates at 124.

Figure 4G:
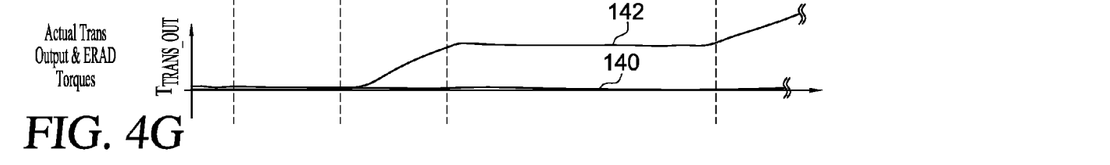

In FIG. 4G, torque 140 produced by ERAD 20 is zero since only front axle wheel torque $T_{W\_FA}$, is desired. The transmission output torque 142 is zero until it ramps-up at the beginning of creep control 120 as the input clutch 38, 39 gains torque capacity, and remains constant during period D until creep control terminates at 124.

Figure 5A:
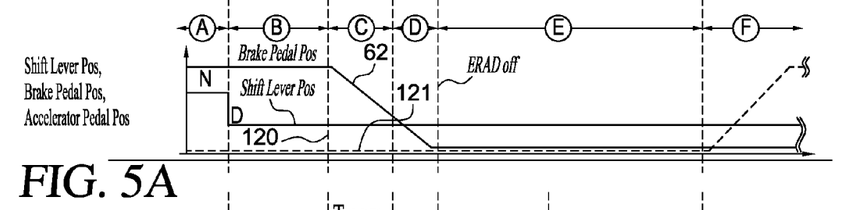
FIGS. 5A-5G are graphs of various powertrain and vehicle parameters before, during and following a vehicle creep condition in which torque blending occurs.

FIGS. 5A-5G are graphs of various powertrain and vehicle parameters before, during and following a vehicle creep condition in which torque blending occurs. FIG. 5A shows that the gear selector 88 may be in the N or neutral position during period A, thereafter it is moved to the D or drive position at the beginning of period B before vehicle creep control begins. The brake pedal 62 is depressed during periods A and B, is released at the beginning of period C, where vehicle creep control begins 120, and continues to be released until the beginning of period D. The accelerator pedal displacement 121 is zero throughout periods A-D and is depressed gradually during period E, which terminates the vehicle creep control.

Figure 5B:
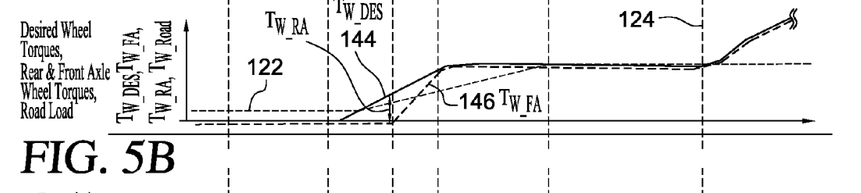

In FIG. 5B, the overall desired wheel torque $T_{W\_DES}$ 144 is initially all provided by ERAD 20 to the rear wheels during period C following the beginning of creep control at 120 until the period D at which the desired front axle torque 146 $T_{W\_FA}$ ramps-up to meet the desired wheel torque. ERAD torque is reduced to zero as the front axle torque 146 produced by engine 12 and the CISG 16 is blended in and remains constant until creep control terminates at 124.

Figure 5C:
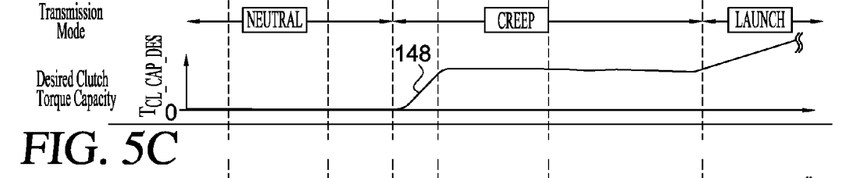

In FIG. 5C, the input clutch torque capacity 148 is zero until period D when it begins to ramp-up since there's an increase in the desired front axle wheel torque $T_{W\_FA}$ after a brief period C. The input clutch torque capacity is zero during period C since vehicle creep is solely provided by ERAD 20. During period E, the input clutch torque capacity 148 remains constant until creep control terminates at 124.

Figure 5D:
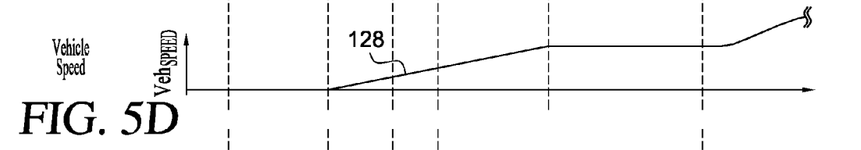

In FIG. 5D, vehicle speed 128 is zero until it ramps-up at the beginning of creep control 120 as ERAD torque drives the rear wheels 34, 35. Vehicle speed reaches a controlled steady vehicle creep speed at a point during period E once the wheel torque equals the road load 122, and remains constant until creep control terminates at 124.

Figure 5E:
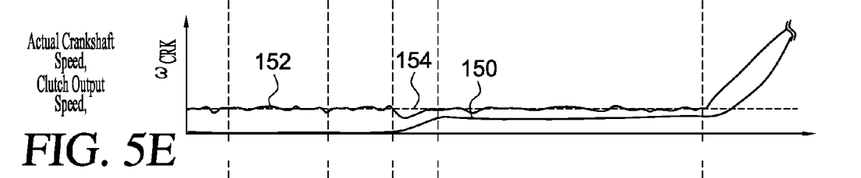

In FIG. 5E, the speed 150 at the gear box side, i.e. the clutch output side of the input clutch 38, 39, is zero until it ramps-up during period D as the input clutch gains torque capacity. During period E clutch speed 150 remains constant until creep control terminates at 124. The speed 152 of crankshaft 18 is controlled to a constant desired crankshaft idle speed 154 until creep control terminates at 124.

Figure 5F:
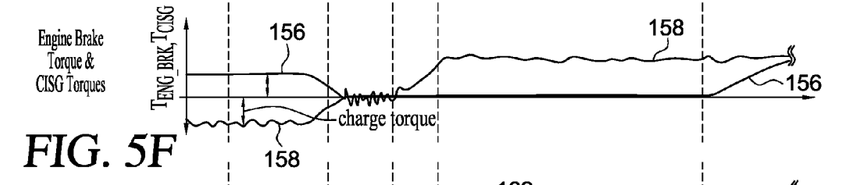

In FIG. 5F, engine brake torque 156 is positive and constant while battery 42 is being charged to the reference SOC required to supply electric energy to the CISG 16 and ERAD 20. Engine brake torque 156 decreases following the battery charge and remains constant until creep control terminates at 124. CISG torque 158 is negative during the battery charging period, and is controlled to a delta torque around zero during period C in order to maintain idle speed while ERAD 20 is providing all the wheel torque. In order to maintain idle speed control, CISG torque 158 ramps-up to a positive torque while input clutch torque capacity increases during period D, and remains constant and positive until creep control terminates at 124.

Figure 5G:
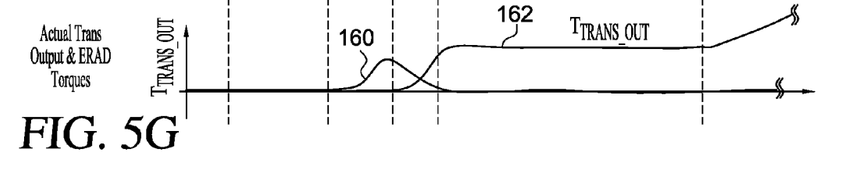

In FIG. 5G, torque 160 produced by ERAD 20 increases during period C as the brake pedal 62 is released at the beginning of creep control at 120 and decreases to zero during period D while transmission output torque 162 increases as the input clutch torque capacity 146 increases. Initially, during period C vehicle creep is powered solely by ERAD torque at the rear wheels 34, 35. After ERAD torque reaches zero at the end of period D, vehicle creep is powered solely by the engine and CISG torque at the front wheels 32, 33. The transmission output torque 162 remains constant after reaching its steady state magnitude until creep control terminates at 124.

The vehicle creep control provides coordinated clutch torque capacity control when vehicle creep is provided or assisted by the additional electric machines, i.e., torque blending, and robust, responsive engine idle speed control as creep propulsion is provided through the transmission. By using the CISG 16 to directly account for the clutch torque capacity disturbance, engine manifold filling delays can be avoided, thus leading to an optimum idle speed control.

Figure 6:
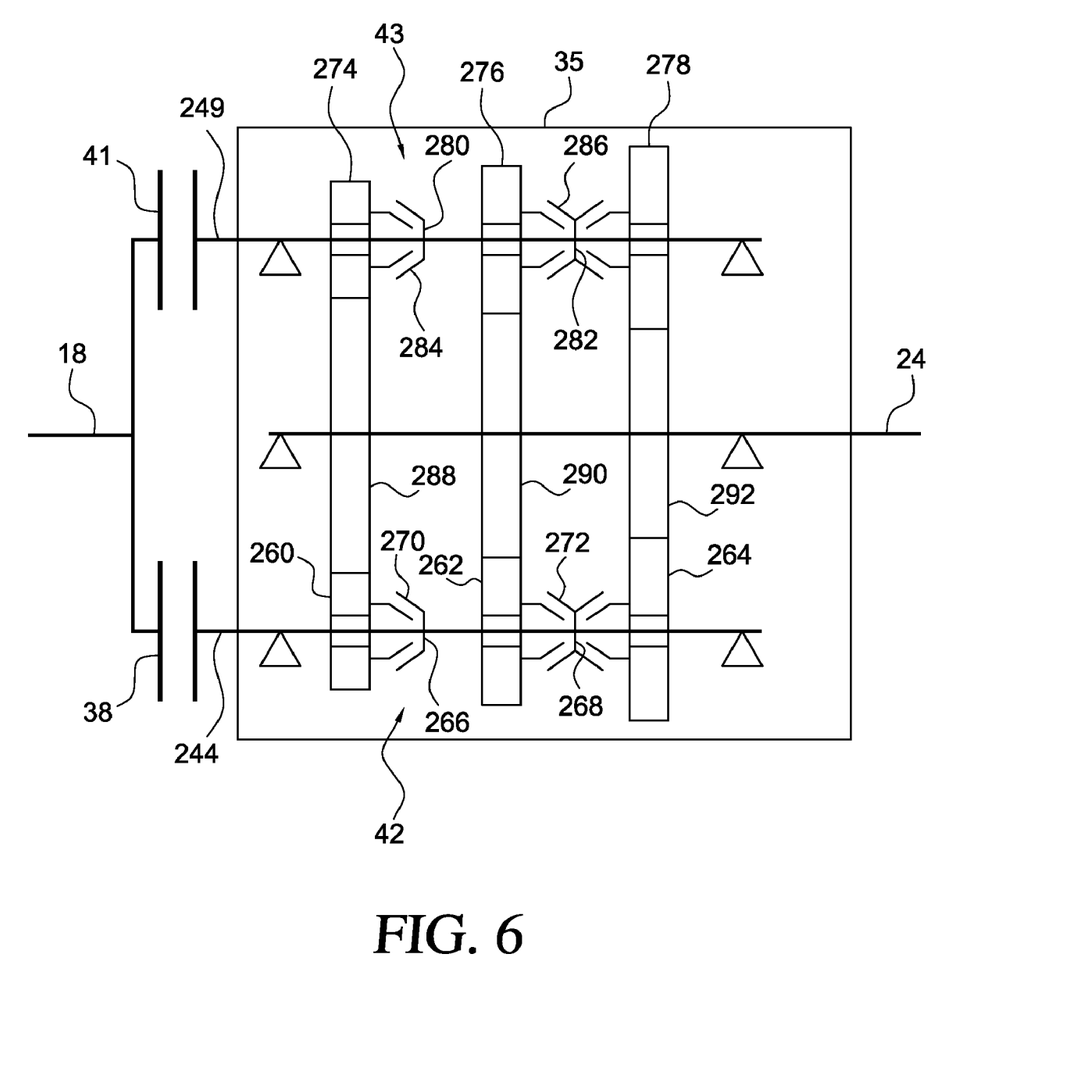
FIG. 6 is a schematic diagram showing details of a powershift transmission.

FIG. 6 illustrates details of a powershift transmission 14 that includes the first input clutch 38, which selective connects the input 18 of the transmission alternately to the even-numbered gears 42 associated with a first layshaft 244, and a second input clutch 241, which selective connects the input 20 alternately to the odd-numbered gears 243 associated with a second layshaft 249. Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 24 supports gears 288, 290, 292, which are each secured to output shaft 24. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these.

In accordance with the provisions of the patent statutes, the preferred embodiment has been described. However, it should be noted that the alternate embodiments can be practiced otherwise than as specifically illustrated and described.

What is claimed is:

1. A method for controlling vehicle creep, comprising:
   (a) using a crankshaft speed error to determine a change in electric machine torque that would produce a desired crankshaft idle speed;
   (b) using a desired magnitude of input clutch torque capacity and said change in electric machine torque to determine a desired magnitude of electric machine torque; and
   (c) using the desired electric machine torque to drive the vehicle.

2. The method of claim 1 further including the step of using a battery to supply electric power to the machine.

3. The method of claim 1 wherein step (a) further includes the steps of:
   determining a desired crankshaft idle speed;
   determining an idle speed error from a difference between a current crankshaft idle speed and the desired crankshaft idle speed; and
   determining the desired change in torque produced by the electric machine such that the idle speed error is minimized.

4. The method of claim 1 further comprising the steps of:
   determining whether a battery state of charge is low or high relative to a reference state of charge;
   if the battery state of charge is greater than the reference state of charge, using an electric machine to produce said desired magnitude of machine torque;
   if the battery state of charge is less than the reference state of charge:
     using an engine to drive the machine;
     using the machine to generate electric energy; and
     storing in a battery electric energy produced by the machine.

5. The method of claim 1 wherein step (a) further includes the step of using a speed of the vehicle and a position of a brake pedal to determine the desired magnitude of torque transmitted through a transmission input clutch.

6. The method of claim 1 wherein step (a) further includes the step of using a speed of the vehicle and a brake system pressure to determine the desired magnitude of torque transmitted through a transmission input clutch.

7. In a vehicle powertrain, an engine including a crankshaft, a first machine driveably connected to the crankshaft and able to operate alternately as an electric motor and electric generator, a transmission including an input clutch driveably connected to the crankshaft and an output driveably connected to a first set of wheels, a second machine able to operate as an electric motor and driveably connected to a second set of wheels, and an electric storage battery having a variable state of charge and electrically connected to the first machine and second machines, a method for controlling vehicle creep, comprising the steps of:
(a) using the second machine to produce torque and drive the second set of wheels after vehicle creep control begins;
(b) adjusting a torque capacity of the input clutch to a desired magnitude of input clutch torque transmitted to the first set of wheels during a vehicle creep condition;
(c) determining a desired change in torque produced by the first machine such that a speed of the crankshaft is controlled to a desired idle speed;
(d) using the magnitude of input clutch torque capacity and the desired change in torque produced by the first machine to determine a desired magnitude first machine torque; and
(e) decreasing torque produced by the second machine and using the first machine to produce said desired magnitude of first machine torque and the engine to drive the first set of wheels during the vehicle creep condition.

8. The method of claim 7 further including using the battery to supply electric power to the machines.

9. The method of claim 7 wherein step (c) further includes:
determining a desired crankshaft idle speed;
determining an idle speed error from a difference between a current crankshaft idle speed and the desired crankshaft idle speed; and
determining the desired change in torque produced by the machine such that the idle speed error is minimized.

10. The method of claim 7 further including the steps of:
determining whether the state of charge is low or high relative to a reference state of charge;
if the state of charge is greater than the reference state of charge, using the first machine to produce said desired magnitude of first machine torque;
if the state of charge is less than the reference state of charge:
using the engine to drive the first machine;
using the first machine to generate electric energy; and
storing in the battery electric energy produced by the first machine.

11. The method of claim 7 further including the step of using a speed of the vehicle and a position of a brake pedal to determine the desired magnitude of torque transmitted through the input clutch.

12. The method of claim 7 wherein step (b) further includes the step of using a speed of the vehicle and a brake system pressure to determine the desired magnitude of torque transmitted through the input clutch.

13. A system for controlling a powertrain during a vehicle creep condition comprising:
wheels for driving the vehicle;
an engine including a crankshaft;
a machine driveably connected to the crankshaft and able to operate alternately as an electric motor and an electric generator;
a transmission including an input clutch driveably connected to the crankshaft, and an output driveably connected to the wheels;
an electric storage battery having a variable state of charge and electrically connected to the machine; and
a controller configured to use a crankshaft speed error to determine a change in electric machine torque that would produce a desired crankshaft idle speed, to use a desired magnitude of input clutch torque capacity and said change in electric machine torque to determine a desired magnitude of electric machine torque, and to cause the desired electric machine torque to drive the vehicle.

14. The system of claim 13, wherein the controller is further configured to use a battery to supply electric power to the machine.

15. The system of claim 13 wherein the controller is further configured to determine a desired crankshaft idle speed, determine the idle speed error from a difference between a current crankshaft idle speed and the desired crankshaft idle speed, and determine the desired change in torque produced by the machine such that the idle speed error is minimized.

16. The system of claim 13 wherein the controller is further configured to determine whether a battery state of charge is low or high relative to a reference state of charge; if said state of charge is greater than the reference state of charge, to use the machine to produce said desired magnitude of machine torque; if said state of charge is less than the reference state of charge, to use the engine to drive the machine; to use the machine to generate electric energy; and to store in the battery electric energy produced by the machine.

17. The system of claim 13 wherein the controller is further configured to use a speed of the vehicle and a position of a brake pedal to determine the desired magnitude of torque transmitted through the input clutch.

18. The system of claim 13 wherein the controller is further configured to use a speed of the vehicle and a brake system pressure to determine the desired magnitude of torque transmitted through the input clutch.

19. A system for controlling a powertrain during a vehicle creep condition comprising:
first and second sets of wheels for driving the vehicle;
an engine including a crankshaft;
a first machine driveably connected to the crankshaft and able to operate alternately as an electric motor and an electric generator;
a transmission including an input clutch driveably connected to the crankshaft, and an output driveably connected to the first set of wheels;
a second machine able to operate as an electric motor and driveably connected to the second set of wheels;
an electric storage battery having a variable state of charge and electrically connected to the machines; and
a controller configured to use the second machine to produce torque and drive the second set of wheels after vehicle creep condition begins; to adjust a torque capacity of the input clutch to a desired magnitude of input clutch torque transmitted to the first set of wheels during the a vehicle creep condition; to determine a desired change in torque produced by the first machine such that a speed of the crankshaft is controlled to a desired idle speed; to use the magnitude of input clutch torque capacity and the desired change in torque produced by the machine to determine a desired magnitude machine torque; to decrease torque produced by the second machine, and to use the first machine to produce said desired magnitude of first machine torque and the engine to drive the first set of wheels during the vehicle creep condition.

20. The system of claim 19, wherein the controller is further configured to use the battery to supply electric power to the machines.

21. The system of claim 19 wherein the controller is further configured to determine a desired crankshaft idle speed, determine an idle speed error from a difference between a current crankshaft idle speed and the desired crankshaft idle speed, and determine the desired change in torque produced by the machine such that the idle speed error is minimized.

22. The system of claim 19 wherein the controller is further configured to determine whether the state of charge is low or high relative to a reference state of charge; if the state of charge is greater than the reference state of charge, to use the first machine to produce said desired magnitude of machine torque; if the state of charge is less than the reference state of charge, to use the engine to drive the machine, to use the first machine to generate electric energy, and to store in the battery electric energy produced by the first machine.

23. The system of claim 19 wherein the controller is further configured to use a speed of the vehicle and a position of a brake pedal to determine the desired magnitude of torque transmitted through the input clutch.

24. The system of claim 19 wherein the controller is further configured to use a speed of the vehicle and a brake system pressure to determine the desired magnitude of torque transmitted through the input clutch.

25. In a vehicle powertrain, an engine including a crankshaft, a first machine driveably connected to the crankshaft and able to operate alternately as an electric motor and electric generator, a transmission including an input clutch driveably connected to the crankshaft and an output driveably connected to a first set of wheels, a second machine able to operate as an electric motor and driveably connected to a second set of wheels, and an electric storage battery having a variable state of charge and electrically connected to the first machine, a method for controlling vehicle creep, comprising the steps of:
  (a) using the second machine to produce torque and drive the second set of wheels after vehicle creep control begins;
  (b) adjusting a torque capacity of the input clutch to a desired magnitude of input clutch torque transmitted to the first set of wheels during a vehicle creep condition;
  (c) determining a desired change in torque produced by the first machine such that a speed of the crankshaft is controlled to a desired idle speed;
  (d) using the magnitude of input clutch torque capacity and the desired change in torque produced by the first machine to determine a desired magnitude first machine torque; and
  (e) decreasing the torque capacity of the input clutch, decreasing the torque produced by the first machine, and increasing torque produced by the second machine to drive the vehicle wheels during the vehicle creep condition.

* * * * *